(12) United States Patent
Gaiser et al.

(10) Patent No.: US 12,331,729 B2
(45) Date of Patent: Jun. 17, 2025

(54) STACKED LAMINATION ENDPLATE

(71) Applicant: Amber Kinetics, Inc., Union City, CA (US)

(72) Inventors: Kyle B. Gaiser, Union City, CA (US); Seth R. Sanders, Berkeley, CA (US); Mark J. Holloway, Mountain View, CA (US); Keenan William Rodewald, Union City, CA (US); Kiana Wright, Oakland, CA (US)

(73) Assignee: AMBER KINETICS, INC., Union City, CA (US)

( * ) Notice: Subject to any disclaimer, the term of this patent is extended or adjusted under 35 U.S.C. 154(b) by 101 days.

(21) Appl. No.: 18/088,493

(22) Filed: Dec. 23, 2022

(65) Prior Publication Data

US 2023/0213023 A1 Jul. 6, 2023

Related U.S. Application Data

(60) Provisional application No. 63/294,161, filed on Dec. 28, 2021.

(51) Int. Cl.
*F03G 3/08* (2006.01)
*B32B 3/26* (2006.01)
(Continued)

(52) U.S. Cl.
CPC ............. *F03G 3/08* (2013.01); *B32B 3/266* (2013.01); *B32B 7/12* (2013.01); *B32B 15/043* (2013.01);
(Continued)

(58) Field of Classification Search
CPC .. F03G 3/08; B32B 3/266; B32B 7/12; B32B 15/043; B32B 15/18; B32B 2603/00;
(Continued)

(56) References Cited

U.S. PATENT DOCUMENTS 3,985,000 A * 10/1976 Hartz ..................... F16D 3/79
403/220
4,538,079 A * 8/1985 Nakayama ............. H02K 7/025
310/74
(Continued)

FOREIGN PATENT DOCUMENTS

DE  19724772 A1 * 12/1998 ............... F16D 3/64
EP  0155327 B1 *  1/1988 ............... F16F 15/30
(Continued)

OTHER PUBLICATIONS

Translation of abstract of DE 19724772 A1, Martens, Dec. 24, 1998 (Year: 1998).*
(Continued)

*Primary Examiner* — Vinh Luong
(74) *Attorney, Agent, or Firm* — SOQUEL GROUP LLC

(57) ABSTRACT

A stacked lamination endplate for a rotor that includes a number of adjacent laminations, stacked one on top of another, wherein each lamination has an identical shape, the shape having a central region, symmetric about a center axis, and a number of spokes, each spoke emanating radially outward from the central region, where each spoke includes a through-hole at its distal end, and wherein the laminations are stacked one on top of another and aligned, enabling, for each spoke, a bolt to be inserted through a corresponding through-hole of each lamination.

11 Claims, 7 Drawing Sheets

(51) Int. Cl.
  *B32B 7/12*   (2006.01)
  *B32B 15/04*  (2006.01)
  *B32B 15/18*  (2006.01)
  *H02K 7/02*   (2006.01)
(52) U.S. Cl.
  CPC .............. *B32B 15/18* (2013.01); *H02K 7/02* (2013.01); *B32B 2603/00* (2013.01)
(58) Field of Classification Search
  CPC ... B32B 2255/02; B32B 2255/10; B32B 5/26; B32B 2255/26; B32B 2262/106; B32B 2457/00; B32B 5/02; B32B 13/04; B32B 27/08; H02K 7/02; H02K 7/025; H02K 7/003; Y02E 60/16; F16F 15/315; F16F 15/30; B60L 50/30; Y02T 10/64; Y02T 10/70; Y10T 74/2119
  See application file for complete search history.

(56) References Cited

U.S. PATENT DOCUMENTS

| | | | | |
|---|---|---|---|---|
| 5,735,669 | A * | 4/1998 | Niemela | F04D 29/281 416/183 |
| 9,464,658 | B2 * | 10/2016 | Cloud | F16B 25/106 |
| 11,293,517 | B2 * | 4/2022 | Pullen | B60L 50/30 |
| 2003/0029269 | A1 * | 2/2003 | Gabrys | F16F 15/3153 74/572.11 |
| 2011/0289647 | A1 * | 12/2011 | Chiao | B32B 37/02 156/60 |
| 2011/0290109 | A1 * | 12/2011 | Khiavi | B01D 53/0473 96/115 |
| 2014/0260780 | A1 * | 9/2014 | Simons | F16F 15/305 74/572.12 |
| 2016/0178031 | A1 * | 6/2016 | Pullen | B60L 50/30 74/572.11 |
| 2016/0241105 | A1 * | 8/2016 | Moore | H02K 5/1735 |
| 2020/0259379 | A1 * | 8/2020 | Sanders | H02K 1/30 |
| 2023/0213023 | A1 | 7/2023 | Gaiser et al. | |
| 2023/0246481 | A1 * | 8/2023 | Walkingshaw | H02K 7/025 700/295 |

FOREIGN PATENT DOCUMENTS

| | | | | |
|---|---|---|---|---|
| JP | H08338477 A | * | 12/1996 | |
| WO | WO-2014119422 A1 | * | 8/2014 | H02K 1/22 |
| WO | WO-2020151870 A1 | * | 7/2020 | |
| WO | WO-2023161639 A1 | * | 8/2023 | F16B 33/004 |

OTHER PUBLICATIONS

Translation of JP H08338477 A, Nosaka, Dec. 24, 1996 (Year: 1996).*

Translation of WO-2020151870-A1, Weber et al., Jul. 30, 2020 (Year: 2020).*

* cited by examiner

STACKED LAMINATION ENDPLATE

BACKGROUND

1. Field of Art

This description generally relates to the design of an endplate for a rotor. Specifically, it pertains to the design of an endplate, formed of stacked laminations, suitable for use in conjunction with a flywheel rotor.

2. Description of the Related Art

Modern energy storage rotors applied in multi-hour utility scale applications, as well as in short duration power applications such as Uninterruptible Power Supply (UPS) settings, are commonly built either with composite fiber wound rotors, or from steel. When addressing the multi-hour discharge applications that occur in utility applications, as well as in some commercial/industrial settings, optimizing rotor cost is a central objective.

The cost of a flywheel rotor may constitute in the range of 50% of the manufactured system cost. Thus, the other flywheel components constitute the other half of the system cost. And many of these system costs scale with rotor volume and/or mass. Thus, reducing rotor volume and mass is a premium concern in flywheel energy storage systems.

Monolithic steel rotors enable utilization of standard steel working processes—primary melt, secondary re-melt purification steps, forge, quench, and temper—to arrive at a desired shape and material mechanical property set within an attainable design space. In general, rotor shapes can be characterized by a "shape factor" k $$k = \frac{E}{\sigma V} \quad \text{Equation 1}$$

where E is the stored kinetic energy, V is the total rotor volume, and σ is the peak stress in the rotor. Shape factors range from 0 to 1. Roughly, the shape factor is an indicator of efficacy of rotor material utilization. High shape factor is an indicator that stresses are distributed rather uniformly over the rotor volume, thus corresponding to good material utilization. As can also be seen from the definition of shape factor, stored energy scales directly with rotor peak stress. Thus, the practically useable peak stress defines how much energy can be stored in the rotor. The maximal peak stress may be limited by a failure criteria related to material yield or ultimate stress, or may be limited by a cyclic fatigue constraint.

In general, large multi-ton monolithic solid cylindrical rotors with substantial axial thicknesses in the range of 6-20 inches have shape factors in the range of 0.55. For very thin disks, analyzed with the assumption of two-dimensional plane stress (zero axial stress), shape factor evaluates to just above 0.6 representing approximately a 10% improvement for such a thin disk relative to the monolithic rotor.

In order to manufacture a rotor with adequate energy capacity, the total volume (or mass) of the rotor needs to be dimensioned appropriately. The use of a stacked lamination construction of a rotor decouples the rotor size from the manufacturing process for the individual laminations. The size of a cylindrical rotor, which is symmetric about a central axis, is specified by its axial length and its diameter, or lateral length. The diameter is only limited by available supply widths of material stock, i.e. the coil width. And, the axial dimension for a stacked lamination rotor is defined by how many laminations are stacked. Thus, virtually any axial dimension of rotor can be realized. The relatively unconstrained rotor dimension that can be achieved with the stacked lamination approach contrasts with the dimensions realizable using solid forging, an alternative approach used in the manufacturing of solid rotors.

Cold rolling is a process that typically follows a standard hot rolling process, in which previously hot rolled plate material is further reduced in thickness. The term cold rolling refers to the fact that temperatures allowed in the process are below those where scale would be formed on the metallic surface. Cold rolling is used ubiquitously across the metal production industry, with product sold in coils or sheet formats, and many possible alloys, treatments, and finish conditions offered across a large set of metals. Example materials are those used in many parts of automotive manufacturing, such as in readily formable auto body panel parts, as well as in high strength components used in bumpers and structural panels. Silicon steel materials used in the electrical industry to build transformers, motors, and generators are also cold rolled, to achieve required thicknesses, uniformity and finish.

Cold rolled steel materials for critical applications, say in automotive bumpers and structure panels, are readily available with very high tensile strengths, up to 2000 Mpa for example. Such materials are typically offered in thicknesses ranging from about 0.5 mm to 2.0 mm, by leading global suppliers. Material quality is typically excellent, with inspection readily carried out with an automated optical inspection system. Thus, defects are not typically encountered within large panels. Further, very basic carbon steel alloys can be used to achieve very high strengths, since the quenching step for such thin material permits an adequate cooling rate to readily achieve full through hardening even with low alloy steel.

As already noted, there are several cost and performance advantages to laminated steel rotors over monolithic forged steel rotors: (1) the continuous processing of cold rolled steel is more economical than the individual processing required by monolithic rotors. Basically, the ubiquitous, continuous rolling processes replaces the one-off forging step; (2) monolithic rotor thickness is limited by the hardenability of the steel alloy that is used. For a 6-inch-thick rotor to achieve the same strength levels as a 2 mm-thick lamination, a substantially more expensive steel alloy must be used. Monolithic forgings reach a limit in maximum thickness due to hardenability limits, whereas a rotor comprised of cold rolled laminations can be stacked into an assembled rotor as thick as needed because each lamination is individually quenched and tempered; (3) Laminated steel rotors also have advantages in terms of the defects present in the steel. As noted above, the cold rolling and inspection processes produce very high-quality material. Further, in a flywheel rotor, the greatest stresses are in the in-plane radial and hoop (circumferential) directions. Defects oriented perpendicular to the radial or hoop directions will form cracks and grow more quickly than defects parallel to the hoop and radial directions. The rolling process orients grain, and any defects parallel to the rolling direction, which is optimal from a fatigue crack growth perspective. Monolithic forged rotors may have defects oriented parallel with the rotor axis, which is the most vulnerable orientation for fatigue crack growth in such a structure.

Inspection of solid forgings is usually carried out by ultrasonic (UT) inspection through volume, and by magnetic particle and/or die penetrant inspection for surface inspection. Although these are standardized testing processes, the demands are substantial, since an inspection error can be catastrophic. In contrast, the inspection of cold rolled materials has been substantially more automated in production practice, with advantageous results in terms of cost of inspection and ultimate product quality.

In applications intended for many 10,000's of full swing stress cycles, each corresponding to a full deep cycle of the flywheel energy storage system, stress swing is usually practically limited by cyclic fatigue. Cyclic fatigue life is dictated by the presence (or not) of a defect, and its subsequent growth as a crack to a critical dimension which then precipitates fracture. Crack growth is a direct result of stress cycling between a given minimum and maximum level. Since cold rolled laminations have favorable arrangement of their intrinsic residual defects, laminations exhibit excellent resiliency against cyclic fatigue.

U.S. Pat. No. 11,362,558, filed Feb. 11, 2020, to Seth R. Sanders et al., describes a flywheel rotor formed from a number of adjacent laminations, stacked one on top of another. The invention also discloses an endplate at one or both ends of the stack of laminations. Various embodiments of endplates are disclosed in U.S. Pat. No. 11,362,558. However, further research and development indicates that a steel endplate can also benefit from the stacked lamination approach used for the steel rotors disclosed in that patent.

It is with respect to these considerations and others that the present invention has been made.

SUMMARY

The subject invention is directed toward the use of stacked laminations to manufacture an endplate for a flywheel rotor.

Certain embodiments are directed to the design of endplates that bracket, at either end, a stack of laminations that form a rotor. Endplate embodiments include a central region and a plurality of spokes that emanate radially outward from the central region. In one embodiment, each spoke includes a hole that receives a bolt. In certain embodiments, the bolt passes through each rotor lamination and secures the laminations to the endplate. In one embodiment, the endplate itself is constructed from a number of laminations and each lamination has a hole that aligns with the holes in the rotor laminations.

Other embodiments are directed to a stacked lamination endplate for a rotor that includes a number of adjacent laminations, stacked one on top of another, wherein each lamination has an identical shape, the shape having a central region, symmetric about a center axis, and a number of spokes, each spoke emanating radially outward from the central region, where each spoke includes a through-hole at its distal end, and wherein the laminations are stacked one on top of another and aligned, enabling, for each spoke, a bolt to be inserted through a corresponding through-hole of each lamination.

BRIEF DESCRIPTION OF DRAWINGS

Non limiting and non-exhaustive embodiments of the present invention are described with reference to the following drawings. In the drawings, like reference numerals refer to like parts throughout the various figures unless otherwise specified.

Figure 1:
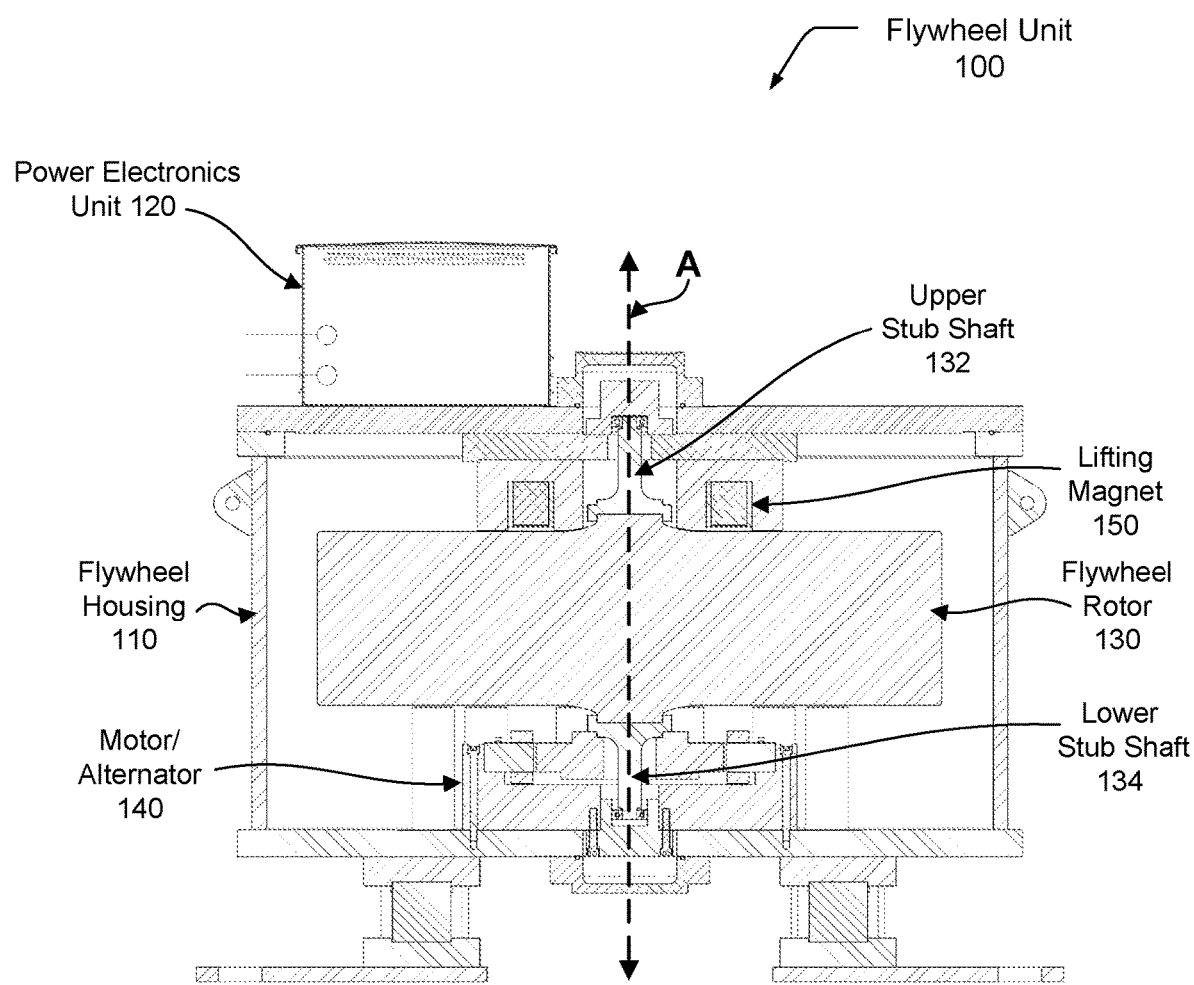
FIG. 1 is a simplified cross section view of one embodiment of a flywheel energy storage system, also referred to as a flywheel unit.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, or devices. The following detailed description is, therefore, not to be taken in a limiting sense.

Introduction

A laminated rotor or a laminated endplate is constructed by stacking many laminations where each of the laminations in the stack has the same shape and the same orientation relative to a center axis. For example, a 300 mm thick rotor requires 150 laminations of 2 mm thickness, each. A 24 mm thick endplate requires 12 laminations of 2 mm thickness. As discussed hereinbelow, endplate thickness will be slightly more than 24 mm in the case that adhesive is used between laminations. Thicknesses for larger designs now underway are substantially greater, perhaps up to about 75 mm for the largest we've conceived so far.

It is possible to design in resiliency against single point defects, by organizing the overall stack design so that in case of a single point defect, adjacent laminations can support the extra load, to avoid a catastrophic failure.

Generally, a rotor comprised of stacked steel laminations can be less costly that that of a monolithic steel rotor and can offer higher stress swing than that of a monolithic forged steel rotor. This directly translates to better performance per unit cost utilization of the rotor, and consequently, to improved utilization of the flywheel balance of system.

It may be appreciated that the shape of a stacked lamination rotor need not be circular since the laminations may be fabricated by stamping, laser cutting, or any other suitable process. Such processes may be used to create any shape; thus, any shape of lamination may be created. Thus, a rotor made of stacked laminations is not restricted to a circular outline or cylindrical shape. Achieving an advantageous shape for a stacked lamination rotor and providing associated support elements is a principal objective of this invention.

Definitions

As used herein the following terms have the meanings given below:

Energy storage system—as used herein, refers to a system that stores and discharges energy. The energy storage system is typically coupled to an electric power grid, enabling the grid to store and withdraw energy as needed.

Flywheel energy storage system, flywheel unit or flywheel device, or flywheel—as used herein, is an energy storage system that stores kinetic energy in a flywheel rotor. When coupled together, one or more flywheel units form an energy storage system. A flywheel unit refers to a flywheel housing or enclosure and any rotors, motor/alternators and other elements that it houses as well as any power electronic elements, which may be housed and mounted on the flywheel enclosure.

Flywheel rotor or rotor—as used herein is a principal component of an energy storage system that is typically a rotationally symmetric mass, such as a cylinder or disc, that spins. The rotor is physically coupled, directly or indirectly, to a motor/alternator that itself is electrically coupled to a converter. The converter may be a single inverter that interfaces the motor/generator to a dc bus. This enables aggregation of multiple flywheels together on the dc bus, which use a common, higher power, inverter When power is received for storage, the rotor is driven, increasing the rotational speed of the flywheel rotor. The faster a flywheel rotor spins, the more energy it stores. When power is to be extracted, the flywheel rotor drives the motor/alternator.

Lamination—as used herein refers to a thin, smooth, flat piece of material, typically steel, that is usually manufactured by a cold rolling process. While cold rolled steel is an obvious example of a material that may be used in a lamination, other types of materials inter alia plastic, aluminum, cement, glass, carbon fiber composite, other composites, steel (other than cold rolled) may be used. As used herein, a lamination is cut into a shape and has two sides, a top side and a bottom side. Unless otherwise specified, herein a lamination is circular, or principally circular, in shape and can be characterized by two dimensions, an axial dimension and a radial or lateral dimension.

Lamination stack—as used herein refers to a 3-dimensional object, such as a rotor or endplate, constructed from a plurality of adjacent laminations, one stacked upon the next. A lamination stack has two ends, a top end and a bottom end. Typically, the laminations have the same shape, are positioned adjacent to one another and have the same rotational orientation in relation to a center axis and are joined or held together. For example, a plurality of circular laminations would appear as a cylinder. A plurality of rectangular laminations would appear as a rectangular cuboid. While the principal application of a lamination stack as described herein is for flywheel energy storage the invention is not so limited. For example, rotors and endplates used in motors and other mechanical devices may take advantage of this invention.

Stacked lamination rotor—as used herein refers to a rotor constructed from a lamination stack, i.e. as a plurality of adjacent laminations, one stacked upon the next.

Stacked lamination endplate—as used herein refers to an endplate constructed from a lamination stack, i.e. as a plurality of adjacent laminations, one stacked upon the next.

Flywheel Energy Storage System

FIG. 1 is a simplified cross section view of one embodiment of a flywheel energy storage system, also referred to as a flywheel unit 100. Flywheel unit 100 includes a flywheel rotor assembly 130 or simply flywheel rotor 130, a motor and alternator 140, also referred to as motor/alternator 140 because both functions are typically performed by a single subsystem, a flywheel housing or enclosure 110, and a power electronics unit 120.

Motor/alternator 140 converts between electrical and mechanical energy, so that energy can be stored in or drawn from the flywheel 130. Motor/alternator 140 combines the function of a motor and an alternator and thus may also be referred to as motor and alternator 140. In certain embodiments, motor/alternator 140 couples to flywheel rotor 130 indirectly, through a lower stub-shaft 134 that in turn couples to a lower journal of flywheel rotor 130, and which also connects to a lower supporting bearing. An upper stub shaft 132 couples to flywheel rotor 130 to an upper bearing. In other embodiments, flywheel rotor 130 incorporates a shaft that couples to motor/alternator 140. Motor/alternator 140 couples to power electronics unit 120 via wires or other electrical couplings that typically run through a vacuum feedthrough through flywheel enclosure 110.

Flywheel unit 100 further includes a lifting magnet 150, also referred to as a magnetic unloader, that levitates, at least partially, the mass of rotor 130. Lifting magnet 150 is positioned above flywheel rotor 130.

Power electronics unit 120 has a housing that encloses and houses electrical components including a power converter for converting the input current, either dc or ac, into an alternating current acceptable to the motor/alternator 140. Power electronics unit 120 may also include sensors, processors, memory, computer storage, and network adapters as necessary to perform communications, control and status monitoring of flywheel unit 100.

Although flywheel housing 110 is shown as enclosing a single flywheel rotor 130 and a single motor/alternator 140 in other embodiments a single enclosure may enclose multiple rotors and motor/alternators.

Rotor Lamination Shape

Although circular disk-shaped laminations are a natural choice for a rotor and offer the most conventional symmetry, other shapes are also practical and are substantially advantageous. Since cold rolled lamination material is usually supplied by a manufacturer in coil format, utilization of the lamination material can be improved with a strategic shape choice. For example, regular polygons that have at least two sides or edges that coincide with an as-supplied coil width use a higher percentage of lamination material than a conventional circle.

Figure 2A:
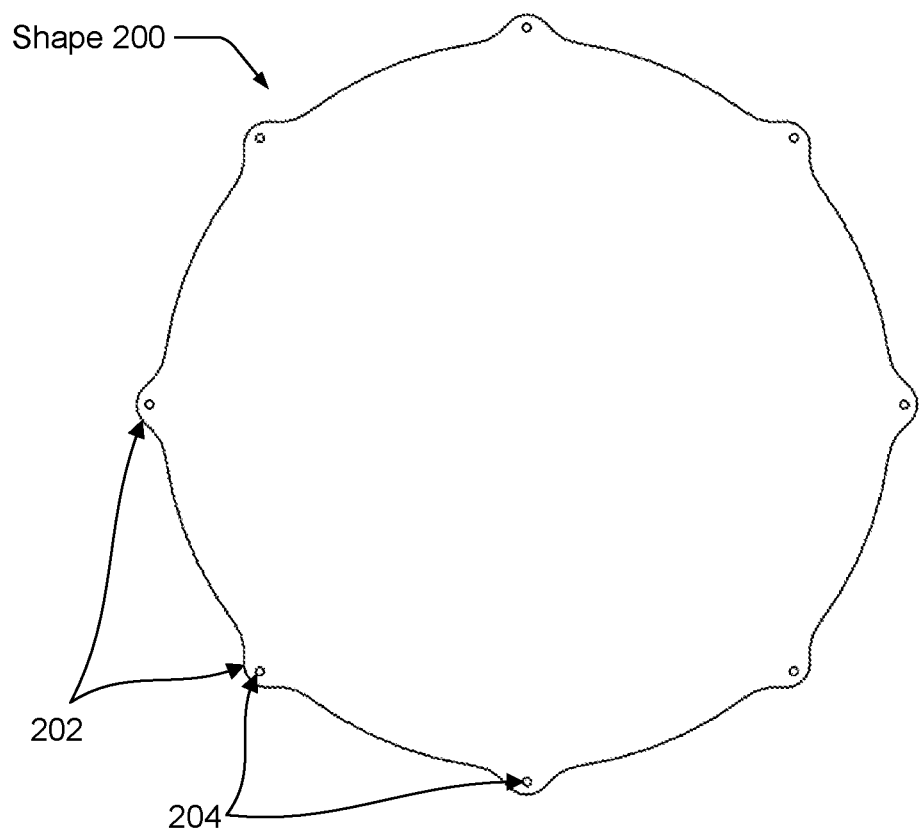
FIG. 2A illustrates a lamination shape, referred to as a scalloped circle, which includes low stress regions near the periphery where through-holes may be inserted.

FIG. 2A illustrates an embodiment of a shape of a lamination used to form a stacked lamination rotor. In this embodiment, each lamination has an identical shape and the shape is symmetric around a center axis. This shape may be referred to as rotationally symmetric. The lamination shape is roughly circular but has protrusions along its periphery or circumference. The protrusions enable through-holes, intended for placement of fastening or joining bolts, to be inserted within the protrusions along the circumference of the lamination shape, thus minimizing the stresses associated with through-holes.

A lamination stack is bound together by a fastening mechanism. In certain embodiments, the fastening mechanism has two or more tie-rods or bolts that pass through the through-holes. The fastening mechanism ensures that each lamination in the stack has the same orientation relative to a central axis when the laminations are fastened. An endplate further secures the stack at one or both axial ends of the stack. While the embodiments of shapes disclosed herein are all rotationally symmetric, the invention is not so limited and shapes that are not rotationally symmetric fall within its scope.

As reference, a circle relative to a square in which it is inscribed, consumes π/4 or about a 0.785 fraction of the available material. A regular octagon which shares a portion of each edge of the supplied square, consumes about a 0.83 fraction of the available material.

Stacked Lamination Manufacturing and Joining Strategy

Joining of laminations in a lamination stack to one another, and to a stub shaft (or shaft) to provide support by a bearing impose an important constraint on shape design. The use of non-circular lamination shapes enables advantageous joining techniques, as described hereinbelow.

Laminations may be joined together by many possible means. These include adhesive bonding, interference fit onto a central shaft as is done with many electric machine rotor assemblies, welding by one of many possible welding processes, and retaining axial bolts.

A variety of adhesives may be used to bond laminations, including acrylic metal glue, cyanoacrylate, anaerobic metal adhesives, and epoxy resin. Epoxy resin, commonly referred to simply as epoxy, is considered to be the strongest adhesive for metal.

Welding on the periphery may be feasible, in some instances, but welding in general imposes material degradation due to the associated heat affected region of the weld. Laser welding is commonly used on small electrical steel lamination stacks, but these lightweight welds are not intended as fundamental structural welds.

The use of a central shaft or axial retention bolts requires through-holes, i.e. holes that pass axially through each lamination in a lamination stack. In general, for regions near the center of the rotor where hoop and radial stresses are nearly equal (bi-axial stress condition), the hoop stress at the required through-hole is double that of either of the prevalent principal stresses. In regions away from the central region, e.g. on the periphery of a circular disk, the stress is uniaxial, in the hoop (circumferential) orientation. With uniaxial stress, a circular through-hole results in a local stress riser of triple that of the prevalent stress. Thus, through-holes in circular lamination shapes are generally not practical with circular laminations.

Figure 3A:
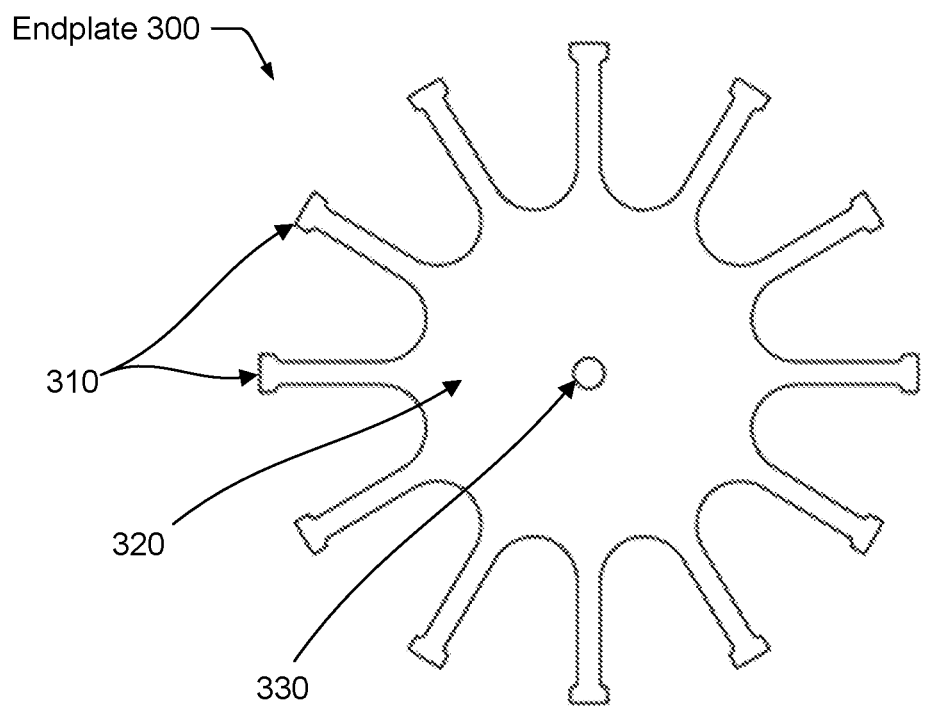
FIG. 3A illustrates one embodiment of an endplate that removes material from around an outer diameter so that the endplate has spokes.

However, since the lamination shape need not be strictly circular, there are many non-circular shapes, such as those depicted in FIGS. 2A and 3A, that permit low stress regions near the periphery where through-holes can be introduced without significantly increasing stress relative to the overall prevalent stresses in the bulk of the lamination.

FIG. 2A gives one example of a lamination shape 200, referred to herein as a scalloped circle, which includes low stress regions near the periphery where through-holes may be introduced. Shape 200 has protruding "scallops" 202, each of which protrudes a small amount beyond the otherwise circular periphery or circumference. Shape 202 has 8 uniformly spaced scallops 202 while other embodiments may have more or less scallops. Under centrifugal loading, scallops 202 are regions that are effectively shielded from the prevalent hoop stress, and thus remain at very low stress. It is thus readily possible to introduce one or more through-holes 204 into one or more scallops, without incurring a difficulty with a stress riser. This approach permits joining the laminations together, with axially oriented bolts. Further, the axial bolts may join or fasten to terminating upper and lower endplates that facilitate interconnection with a respective stubshaft at the top and bottom of the fully assembled rotor.

While the protrusions of shape 200 are equidistant and scallop-shaped, the invention is not so limited. In other embodiments the protrusions may not be equidistant, and the shape of the protrusions may be other than scallop-shaped.

Shape 200 includes a through-hole 204 in each scallop 202. Typically, during the manufacturing process a structural retaining bolt is inserted through each through-hole 204 to provide three-dimensional rigidity for a resulting, assembled, lamination stack. One of the challenges in such an assembly is avoiding slippage under variable load conditions, as well as across operating conditions, such as varying temperatures. Any slippage may lead to a loss of balance, and worse, may lead to dynamic instability if the slippage presents significant damping in the rotating frame. Either outcome associated with slippage is effectively a failure mode. To guard against slippage, the retaining through bolts should be specified to be dimensioned and tensioned to keep adequate compressive surface contact loading throughout the stack in the proximal regions of the through-holes within the scallops or vertices. Frictional consideration against slippage is used to compute the required compressive surface contact stress, and in turn, the through bolt diameter, material, and tension levels.

A convenient method to ascertain bolt tension level is to simply measure the bolt length extension as the bolt is tensioned. This provides a direct measure of the bolt strain and stress state, in contrast with the conventional use of a bolt torque specification.

Another consideration is the use of a forgiving through-hole slot liner, to mitigate bolt and lamination interface wear during bolt insertion, and during operation. With cyclic application of centrifugal loading, the through bolt may (cyclically) deflect within its respective clearance hole, and come to be supported by the side wall of the clearance hole, when under centrifugal load. With cyclic centrifugal loading and unloading, this cyclic interaction with the sidewall constitutes a wear process that may produce surface wear and subsequent degradation of bolt reliability. A slot liner may be produced from hardened steel, a softer metal, like aluminum or brass, or an organic material. A slot liner can be fabricated as an integral tube, or a slotted tube. The latter may be fabricated by bend forming the slot liner from a sheet of aluminum stock, for example, that is in the range of 0.1-1.0 mm thick.

Figure 2B:
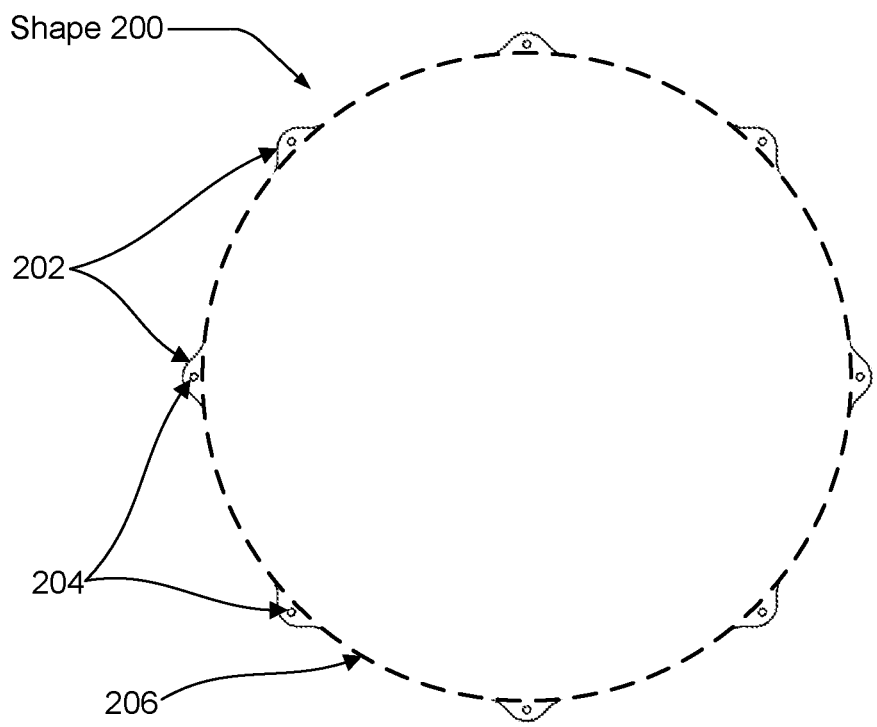
FIG. 2B illustrates, using a dashed line, a circular circumference of the lamination shape of FIG. 2A.

FIG. 2B illustrates, using a dashed line, a circular circumference 206 of lamination shape 200. While shape 200 is not entirely circular due to protruding scallops 202 shape 200 may be understood to have a lamination circumference 206, wherein lamination circumference 206 is the largest inscribed circle within shape 200 that does not include material from any of scallops 202. In this embodiment, each through-hole 204 lies entirely outside circumference 206 but entirely inside a corresponding scallop 202.

Endplate Design

In certain embodiments, for a rotating system that is restrained by two or more mechanical bearings during operation, rest, or transport, the stacked lamination rotor must be joined to a pair of stubshafts to interface with the bearings. The following discussion is focused on a single end of a stacked lamination rotor, with understanding that an equivalent joining approach may be used on either or both ends of the stacked lamination rotor.

Structural through bolts, similar to those discussed hereinabove, may connect to an endplate. The term endplate, as used herein, may inter alia be a single solid part, or it may be formed from a plurality of laminations, or it may be assembled from a number of components. One objective of the endplate is to provide a structurally sufficient connection near the periphery of a rotor between the axial through bolts that pass through the rotor. A second objective is to provide a way for a central stubshaft to connect to, or join to, the rotor.

In certain embodiments, a solid circular endplate is used. Peak equivalent stress in a spinning disk occurs at the center. Any method used to join a cylindrical shaft or other strategically designed stub shaft to a flat plate will create a stress riser in this peak stress region. Furthermore, as discussed above in consideration of the lamination shape designs, introducing a through-hole in a circular endplate near the periphery generates a severe local stress riser. This stress riser, at center and/or periphery, limits the maximum speed and thus energy storage capacity of the rotor. The top and bottom endplates of the rotor must be shaped in a way that reduces the stress on the shaft connection, and on the connections to the structural through bolts.

In certain embodiments, a magnet-based offloading system, referred to herein as lifting magnet 150, provides a magnetic lifting force to the rotor to counteract its gravitational load that would otherwise be imposed on system bearings. To interact with lifting magnet 150, maintaining a region of a ferromagnetic top steel endplate for flywheel rotor 130 with full density and circular symmetry is desirable. Thus, use of magnetic lifting imposes one constraint on the design of the upper endplate.

FIG. 3A illustrates one embodiment of an endplate 300 that removes material from around an outer diameter so that the plate has spokes 310. In endplate 300, material is removed to create spokes 310 that extend radially outward from a central region 320. The reduced mass in the periphery of endplate 300 effectively reduces stress in center region 320, allowing for attachment to lower stub shaft 134. Endplate 300 may attach to stub shaft 132, 134 by a variety of mechanisms, including inter alia a center hole 330, a bore, a bolt circle, or a weld for connection to a shaft. Any number of spokes may be used in this design. In certain embodiment, ends of spokes 310 are then connected to an adjacent lamination stack by direct connection to the previously discussed through bolts. In certain embodiments, a top endplate and a bottom endplate bracket to a lamination stack. In other embodiments, there may be only a single endplate at the top or bottom of a lamination stack.

Central region 330 is typically made of solid ferromagnetic steel to interact with a lifting magnet, such as lifting magnet 150. This constraint is only necessary for an endplate at the top of rotor 130, since lifting magnet 150 is positioned above rotor 130. Thus, in certain embodiments a central region of a lower endplate may not be made of ferromagnetic steel.

Spokes 310 may taper outward or may be dogbone-shaped so that there is more mass at the end of the spoke than along its length. The ends of spokes 310 may be connected via a rim around the outer diameter. The added mass at the end of the spoke can then be designed so that the end of the spoke experiences radial displacement equivalent to that in the adjacent circular plate when undergoing centrifugal loading, preventing a stress riser at the spoke to through bolt joint. The length and width of spokes 310 is determined by the maximum allowable stress at the center of the plate and the area of the offloading magnet used to lift the rotor.

In certain embodiments, endplate 300 may have features beyond what is described above. For example, U.S. Pat. No. 11,362,558, filed on Feb. 11, 2020, by inventor Seth R. Sanders discloses a number of embodiments of endplates.

Use of a monolithic solid steel endplate, i.e. made from a single piece of steel, may be suboptimal with respect to material cost, machining cost, and stress pattern. Embodiments of endplate 300, made of solid steel, require sacrifice, i.e. removal, of a substantial amount of material in manufacture, from an otherwise solid plate, either circular or rectangular. The manufacture also requires substantial machining and finishing steps. And, since the part retains integral solid steel spokes, residual centrifugal loading may still impose limiting stresses in the central region.

Figure 3B:
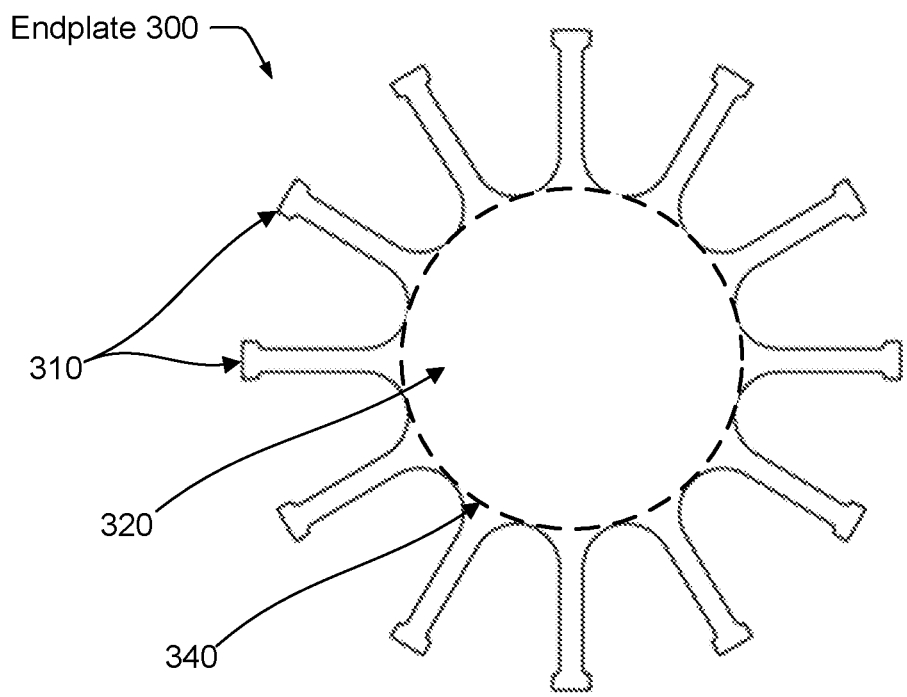
FIG. 3B illustrates, using a dashed line, a circular circumference of a central region of the endplate of FIG. 3A.

In certain embodiments, central region 320 is roughly circular. FIG. 3B illustrates, using a dashed line, a circular circumference 340 of central region 320. While central region 320 is not entirely circular due to protruding spokes 310 central region 320 may be understood to have a circumference 340, wherein circumference 340 is the largest inscribed circle that fits inside central region 320 and that does not include material from any of spokes 310.

Stacked Lamination Endplate

Figure 4A:
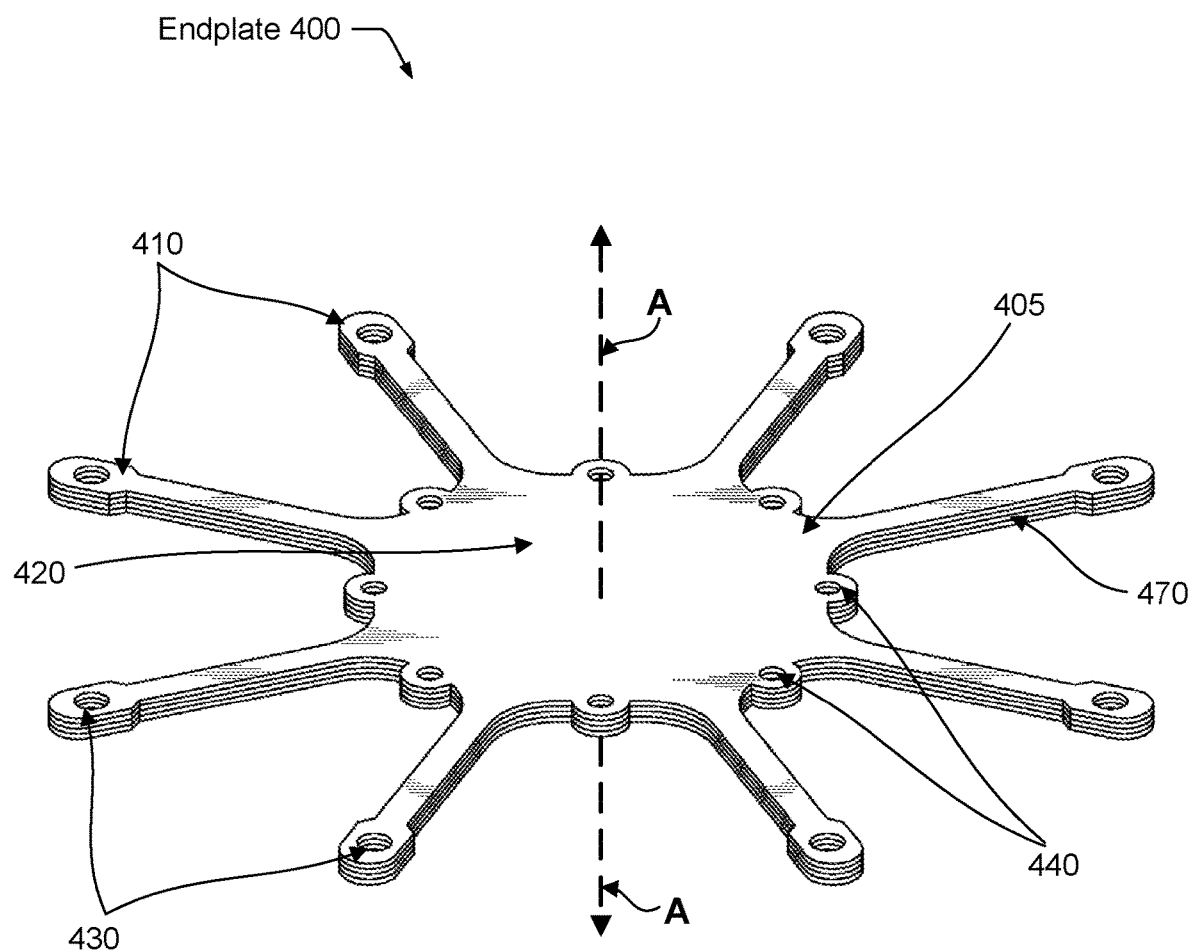
FIG. 4A illustrates an endplate made of stacked laminations.

A stacked lamination endplate 400, also referred to as endplate 400, made of a plurality of stacked laminations 405, as illustrated in FIG. 4A, avoids many of the previously discussed challenges. Most importantly, experience has shown that the cost of machining endplate 400 is greatly reduced in relation to a solid steel endplate of the same shape. For example, the spokes can be created using a low-cost laser cutting device. In endplate 400, each lamination 405 is integral, i.e. made from a single piece of steel or another material. Further, each lamination 405 is identically shaped and is rotationally symmetric about a central axis A. Each lamination 405 has eight spokes 410 and a central region 420. In other endplate embodiments, more or less spokes are used.

Lamination 405 has a through-hole 430 at a distal end of each spoke 410. During the manufacturing process, laminations 405 are stacked one on top of another and aligned, such that for each spoke 410 each corresponding through-hole 430 of each lamination 405 aligns, enabling a bolt or tie rod 447, depicted hereinbelow in FIG. 4B, to pass through all corresponding through-holes 430 of each lamination. In certain embodiments, the bolt that passes through each through-hole 430 of each lamination 405 also passes through the rotor lamination stack. In certain embodiments, through-holes 430 are threaded. In certain embodiments, an adhesive 470 may be used to bond adjacent laminations 405.

In certain embodiments, endplate 400 has one or more intermediate through-holes 440. In endplate 400 there is an intermediate through-hole 440 between each pair of spokes 410. In other embodiments, there may be more or less intermediate through-holes 440. In certain embodiments, intermediate through-holes 440 are threaded and an eye-bolt is inserted. This enables lifting, for example, during installation and maintenance. To simplify the process of creating a thread that passes through each of holes 430, a nut 445, depicted hereinbelow in FIG. 4B, may be inserted and bonded inside hole 430 during the manufacturing process.

In one embodiment, a pattern is cut in some of the laminations that make up holes 430, so as to accept a standard hex nut. The nut is bonded in place while curing an adhesive placed between each layer of endplate 400. With a stack of 12×2 mm sheets, a laser cut hex pattern may be present in say ~5 of the sheets.

Figure 4B:
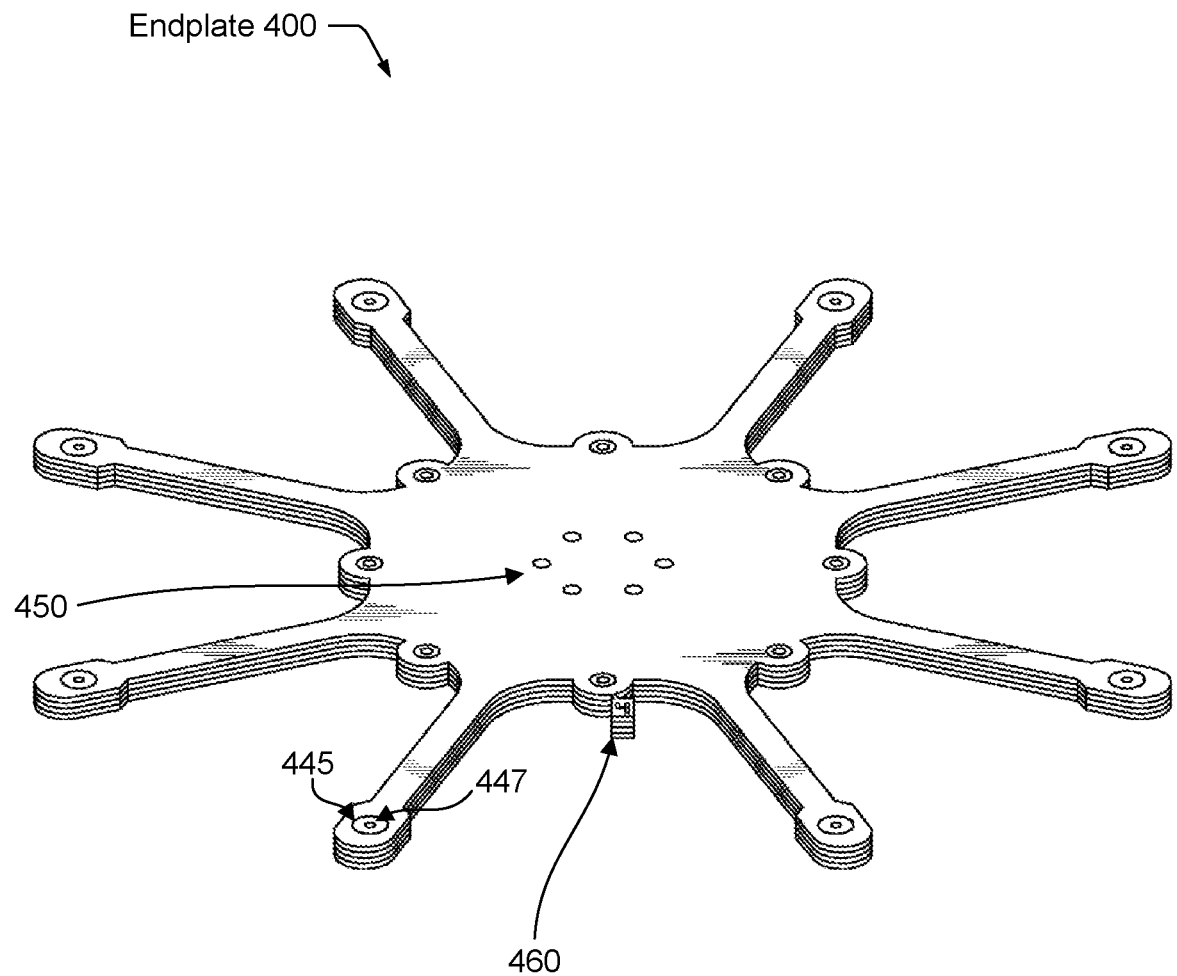
FIG. 4B illustrates an embodiment of the endplate of FIG. 4A that includes an attachment mechanism for a stub-shaft and alignment tags.

FIG. 4B illustrates additional features that may be incorporated into endplate 400. A bolt circle 450 provides a way to join endplate 400 to an adjacent structure, or device such as a stubshaft. For example, bolt circle 450 may be used to join endplate 400 to a stubshaft such as upper stubshaft 132 or lower stubshaft 134, or stubshaft 500 discussed hereinbelow. Other joining mechanisms other than a bolt circle may be used for this purpose, including inter alia a single bolt.

Endplate 400 may also include a tag 460. Tag 460 may be used during the manufacturing process to align each of endplate laminations 405 with respect to each other. Alignment may be used to compensate for variable thickness and other properties that vary due to the rolling manufacturing process used to create sheets. Tag 460 may be an integral part of one or more laminations 405, effected, for example, by laser cutting. Alternatively, inter alia, it may be affixed to one or more laminations 405. In certain embodiments, each sheet is rotated with respect to adjacent neighbor sheets so as to maintain uniformity among properties such as thickness across the 8 spokes.

As previously discussed, it is more cost effective to manufacture stacked lamination endplate 400 than it is to manufacture a similarly shaped solid endplate of comparable size and depth.

Manufacturing Steps

One example process for manufacturing endplate 400 includes the following principal steps:

Each lamination is cut from a flat sheet of steel that has been rolled into a rectangular or other shape. Due to the rolling process, there are slight irregularities in the thickness of the material. For example, the center of a sheet may be somewhat thicker than the edges. To create a single, bonded, endplate from a number of laminations these thickness irregularities must be compensated for during subsequent manufacturing steps. One manufacturing process for creating a stacked lamination endplate which yields acceptable results is presented below:

1. Cut one or more square sheets from a stock coil of rolled steel, each sheet large enough to fit an endplate lamination. Various methods may be used to cut including inter alia laser blanking and shearing.
2. Laser cut or stamp each endplate lamination into a designated shape such as the shape of endplate 300. This shape may optionally include the tag.
3. Apply an adhesive such as epoxy to each lamination. In certain embodiments, a film adhesive is used. This is epoxy with hardener already mixed in (as with prepreg fiberglass and carbon fiber materials), and then stored cryogenically until ready to use. The film adhesive is cut to shape and stacks with the steel lamination sheets to obtain uniform bondline properties. (Bondline is the bond layer thickness.) Then, stack each lamination, one on top of the other, with tags aligned (as shown in FIG. 4B). The film adhesive, or any other adhesive, may be applied after each lamination is added to the stack.
4. Incorporate a nut 445 into each through-hole 430.
5. Apply a plastic plug, made of a material such as PEEK, TEFLON or DELRIN, or other type of plug, to the topmost and bottommost through-hole 430 and intermediate through-hole 440 in the lamination stack. This prevents epoxy from entering the hole during subsequent steps. Use of a polymer like PEEK is advantageous since it has a temperature coefficient of expansion greater than steel. When curing the epoxy in a platen press at elevated temperature, the plug expands tightly filling the hole and preventing ingress of epoxy. Upon cooling, the plug shrinks back down, and can be readily removed. PEEK is one possible material, that is also advantageous because of its strength, frictional properties, and the fact epoxy does not bond to PEEK. As noted above, other polymer materials like TEFLON and DELRIN are also well suited for this purpose.
6. Using a platen press, apply a designated pressure and temperature profile for the adhesive cure. The profile or program applied by the press controls the temperature according to guidelines provided by the adhesive supplier. Cooling takes place in the platen press.
7. Withdraw plugs from through-holes 430, 440. Remove excess adhesive around the periphery as necessary.

Generalized Endplate Design

Most generally, endplates 300 and 400 each include spokes for reasons previously discussed. Generally, the invention encompasses endplates that are rotationally symmetric, which have a central region, and which have spokes that emanate radially outward from the central region. A variety of spoke shapes and mechanisms for fastening the spokes to the central region may be used. Further, spokes as well as the central region may be made of a variety of materials, including inter alia steel, plastic, and composites inclusive of carbon fiber, Kevlar, and fiberglass. Further, the endplate may have one or more holes in the central region to allow for bolts. Further, the distal end of the spokes may have a through-hole to allow for bolts that fasten the end plate to a rotor lamination stack.

Figure 5:
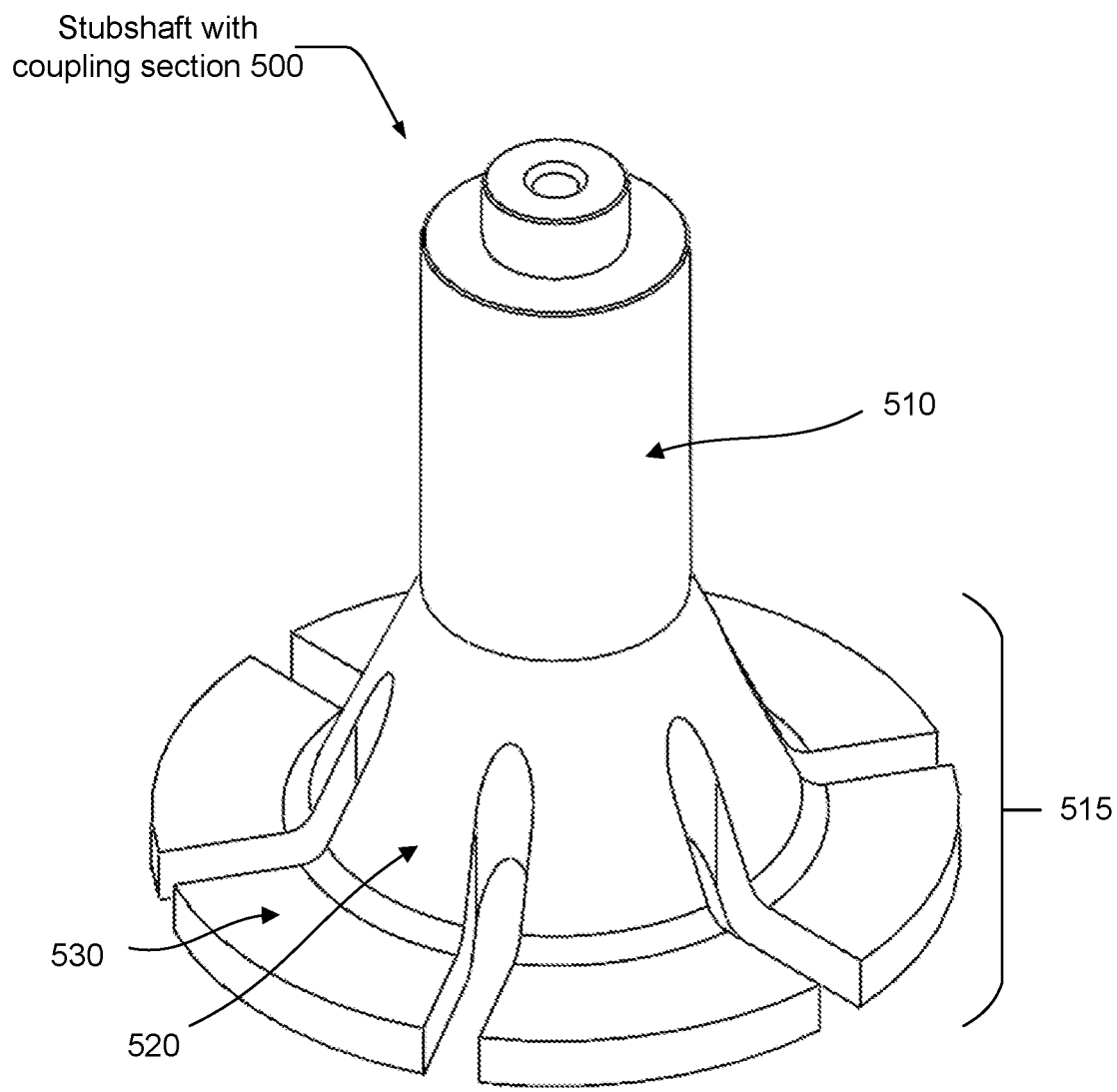
FIG. 5 illustrates one embodiment of a stub shaft that attaches to an endplate.

FIG. 5 illustrates an embodiment of a stub shaft 500 that couples with, or attaches to, an endplate such as endplate 400. Stub shaft 500 is rotationally symmetric with flywheel 130. Stub shaft 500 has a top, cylindrical, section 510 and a bottom end, referred to as a coupling section 515, which attaches to an endplate.

Coupling section 515 includes one or more flanges 530 and a central region 520. Flanges 530, at the bottom of stub shaft 500, connect to an endplate via a bolt circle, such as bolt circle 450, a weld or another type of mechanical attachment such as a single threaded bolt. In certain embodiments, central region 520 is conical shaped, enabling it to flex and allowing flanges 530 to move radially while maintaining sufficient axial stiffness. This design accommodates radial expansion and contraction by rotor 130 at the connection to an endplate.

Stubshaft 500 may be imparted with lateral bending compliance. Such bending compliance may be used as a suspension function in flywheel unit 100 to manage resonant modes. It is often strategic to design such modal frequencies to be below the working speed range, to avoid exciting such resonances during regular operation.

Figure 6:
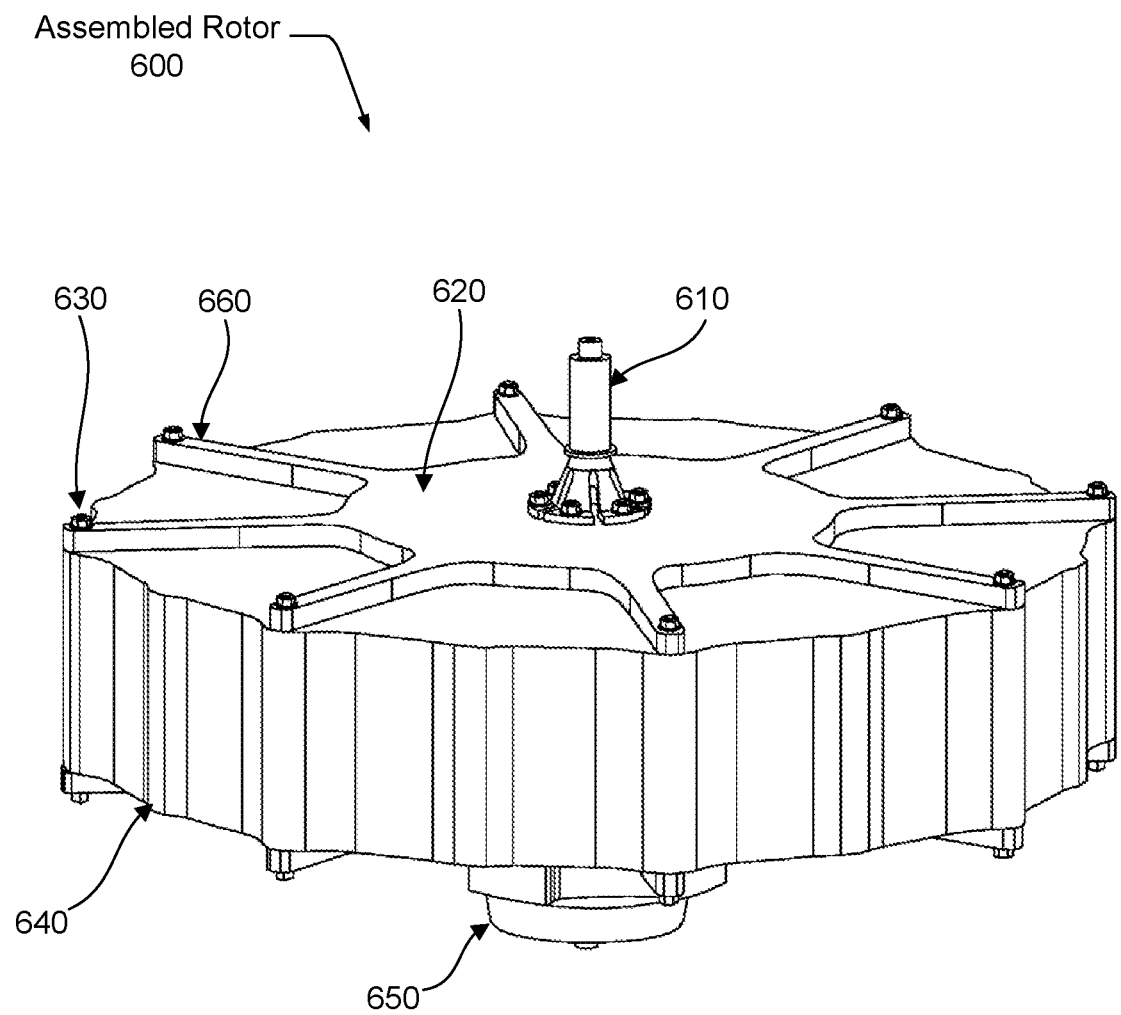
FIG. 6 illustrates an embodiment of a fully assembled rotor suitable for use in a flywheel energy storage system.

FIG. 6 illustrates an embodiment of a fully assembled rotor 600 suitable for use in a flywheel energy storage system. Assembled rotor includes a stubshaft 610, two endplates 620, and a stacked lamination rotor 640. Endplates 620 couple at the top and bottom to stacked lamination rotor 640 via a fastening mechanism 630 that passes through the distal end of each spoke 660. Stacked lamination rotor 640 is formed of a plurality of laminations, each of which has a scalloped circular shape as illustrated in FIG. 2A. Each endplate 620 has eight spokes, each of which has a corresponding through-hole at the distal end through which a bolt or tie-rod is inserted. A portion of a motor/generator 650 couples at the lower end to stacked lamination rotor 640.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A stacked lamination endplate for a rotor, comprising:
    a plurality of adjacent laminations, stacked one on top of another, wherein each lamination has an identical shape, the shape comprising:
        a central region, symmetric about a center axis; and
        a plurality of spokes, each spoke emanating radially outward from the central region, wherein each spoke includes a through-hole at its distal end;
    wherein the laminations are aligned, enabling, for each spoke, a bolt or tie-rod to be inserted through a corresponding through-hole of each lamination, and wherein at least one of the laminations includes a tag, wherein the tag is used during the manufacturing process to align each of plurality of adjacent laminations.

2. The endplate of claim 1 wherein a threaded nut is inserted into the through-hole of each spoke.

3. The endplate of claim 1 wherein there are 8 spokes.

4. The flywheel rotor of claim 1 wherein there is no through-hole through the axial center of the central region.

5. The endplate of claim 1 wherein the laminations are made of a material selected from the group consisting of steel, plastic, carbon fiber, composite, and cement.

6. The endplate of claim 1 wherein each lamination is formed from a single piece of material.

7. The endplate of claim 1 wherein the spokes of a lamination are formed by removing material from regions between adjacent spokes outside the central region.

8. The endplate of claim 1 wherein the identical shape further comprises:
    one or more intermediate through-holes between each pair of adjacent spokes.

9. The endplate of claim 8 wherein the central region is roughly circular in shape and each intermediate through-hole lies exterior to a circumference of the central region.

10. The endplate of claim 1 wherein the identical shape further comprises:
    a bolt-circle in the central region that may be used to join the endplate to a stubshaft.

11. The endplate of claim 1 wherein during the manufacturing process an adhesive is applied to each lamination.

* * * * *